June 6, 1950  J. T. WILLIAMS ET AL  2,510,451
ANTISLIPPING DEVICE

Filed Aug. 4, 1947  2 Sheets-Sheet 1

Inventors
JAMES T. WILLIAMS
KARL F. RIESE
By [signature]
Attorney

June 6, 1950
J. T. WILLIAMS ET AL
2,510,451
ANTISLIPPING DEVICE
Filed Aug. 4, 1947
2 Sheets-Sheet 2
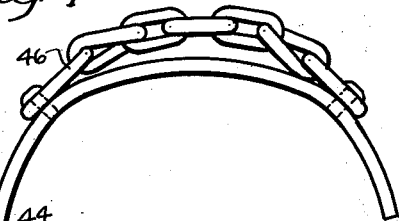
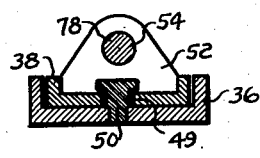
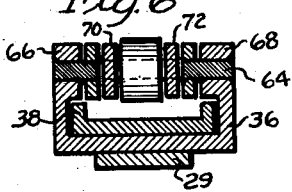
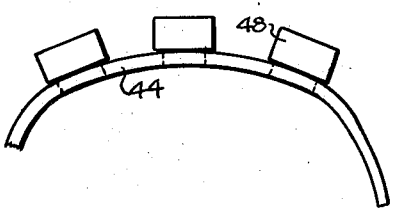
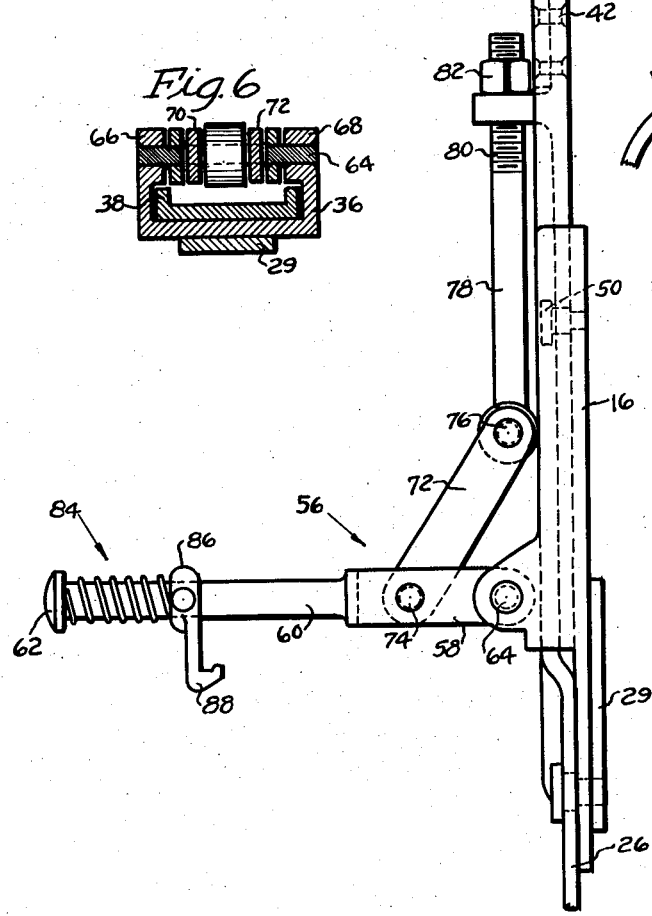
Inventors
JAMES T. WILLIAMS
KARL F. RIESE
By A. O. Whiteley
Attorney Patented June 6, 1950

2,510,451

UNITED STATES PATENT OFFICE 2,510,451

ANTISLIPPING DEVICE

James Thomas Williams, Minneapolis, and Karl F. Riese, St. Paul, Minn.

Application August 4, 1947, Serial No. 765,849

1 Claim. (Cl. 152—225)

Our invention relates to improvements in an anti-slipping device which is adapted for attachment to a vehicle wheel to provide traction in mud or snow, or when the vehicle is traveling over icy surfaces. In particular, it relates to an anti-slipping device formed of a plurality of members angularly disposed with relation to each other about a vehicle wheel and each having a traction-producing surface that is adapted to extend laterally over the periphery of the wheel so as to provide several traction-producing surfaces at spaced apart distances about the periphery of a wheel. The particular features of the device is that an improved locking mechanism is provided for securing the device on the wheel and provision is also made for adjusting the length of one of the arms so as to compensate for minor variations in the diameter of a wheel so that the device may at all times be made secure against slippage on the wheel.

In the prior art relating to structures of this general nature, there have been numerous forms of devices adapted for attachment to vehicle wheels to provide traction in snow or mud or on icy surfaces, but these structures have not been particularly easy to mount on the wheels nor have they been capable of adjustment so as to provide compensation for variations in the diameter of the wheels, which condition may be brought about by variations in size or degree of wear of the tires. The present invention is a continuation in part of our copending application Ser. No. 702,200, filed October 9, 1946, now abandoned.

In the present invention, a plurality of angularly disposed arms extend from a central member to the periphery of the wheel at spaced apart distances amounting to approximately 120°. One portion of the central member is constructed for slidably holding one of the arms for longitudinal movement with relation to the central member so as to provide a clamping action on the wheel which is operative to securely grip the wheel and prevent any slippage with relation to the wheel. A lever mechanism is supported on the central member and is connected through a compound linkage to the movable arm for locking the arm in a secured position. A particular feature of the lever mechanism is that it is movable through an arc of a circle in a plane which is transverse to the plane of the wheel and the central member, thus where the central member and the several arms extend in a plane parallel to the side of the wheel, the lever mechanism is movable in a transverse plane and permits the operator not only to easily mount and secure the structure on the wheel, but also makes this operation relatively simple.

Another feature which is of considerable importance is that an adjustable extension, which constitutes a connection between the lever mechanism and the cooperating arm is constructed for adjustment of the length of the arm so as to compensate for variations in the diameter of the wheel and tire, and also to compensate for wear of the tire.

An object of our invention is to provide an anti-slipping device for a vehicle wheel which includes as a locking mechanism, a lever which is movable in a plane that is transverse to the plane of the wheel.

Another object is to provide an anti-slipping device for a vehicle wheel which includes means for adjustment of the device to the extent of compensating for minor variations in the diameter of the wheel.

Another object is to provide in combination with an anti-slipping device of the class described, a locking lever which is movable in a plane transverse to the plane of the wheel on which the device is to be mounted and a latching mechanism which is cooperable between the lever and a movable arm.

A further object is to provide an anti-slipping device for wheeled vehicles which is formed of a central member which supports a plurality of arms, one of which is slidable on the central member, together with a lever connected between the central member and the movable arm, and wherein the connection between the lever and the arm is adjustable to compensate for variations in the diameter of the wheel.

Other and further objects will become apparent from the following description and claim, and in the appended drawings in which:

Fig. 4 is a side view of the structure shown in Fig. 2 as seen from the right side thereof with the manually operable lever mechanism shown in a raised position;

Fig. 5 is a sectional view taken on the lines 5—5 of Fig. 2;

Fig. 6 is a sectional view taken on the lines 6—6 of Fig. 2; and,

Fig. 7 shows a modified form of traction surface.

Figure 1:
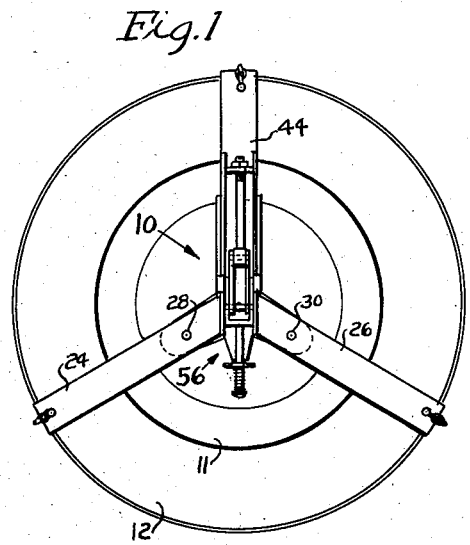
Fig. 1 is a side elevation of a vehicle wheel showing the device forming the present invention mounted on the wheel.

Referring now to the several views of the drawing, the invention will be explained in detail.

In Fig. 1 general reference numeral 10 indicates an anti-slipping device mounted on a conventional automobile wheel 11 carrying a conventional pneumatic tire 12. A device of this nature is applied generally to the rear wheels of an automotive vehicle when the vehicle must travel through deep snow, soft mud, or on icy surfaces, and is intended to give suitable traction to the wheels when traveling is difficult.

Figure 2:
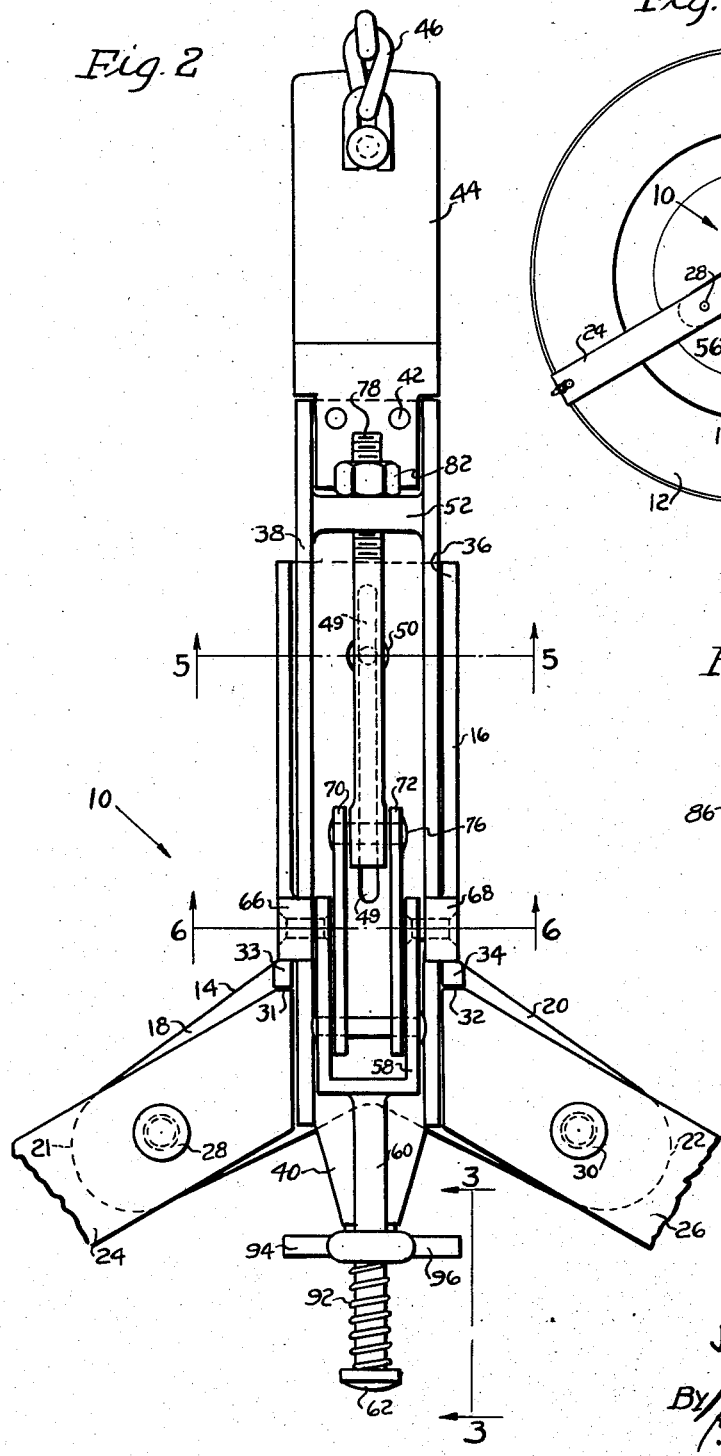
Fig. 2 is an enlarged view in front elevation of an exterior portion of the device.

Referring now to Fig. 2, is shown a central member 14 formed of three extended portions 16, 18 and 20 which diverge from each other in angles of approximately 120°. As will be evident in Fig. 2, the extensions 18 and 20 terminate in curved extremities 21 and 22 and are of shorter length than extension 16.

As is partially shown in Fig. 2, and shown in full in Fig. 1, a pair of arms 24 and 26 are pivotally mounted on members 18 and 20 through the medium of fastening members 28 and 30 which extend through the upper surface of each of the arms and extend through the extension 18 and 20 to a supplementary supporting member 29 on the under surface of central member 14. The inner ends of members 24 and 26 are cut on an angle and are each provided with a flat end surface 31 and 32 for engaging abutments 33 and 34 on member 14 when the arms 24 and 26 are in their properly extended position as shown in Fig. 1.

Figure 3:
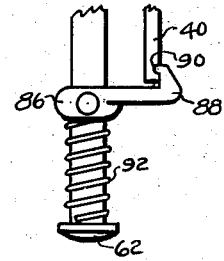
Fig. 3 is a sectional detail view taken on the lines 3—3 of Fig. 2.

The extension 16, as shown in Figs. 2 and 4-6, consists of a channel member 36 within which, and in slidable relation thereto, is a movable arm 38 which, as shown in Figs. 5 and 6, is of channeled shape in cross dimension, but which terminates on its inner or lower end in a flat tongue 40 as shown in Figs. 2, 3 and 4. At its outer end, and as shown in Figs. 2 and 4, arm 38 is joined by rivets 42 to an arcuate shaped portion 44 which extends laterally across the periphery of tire 12 and carries on its outer surface as a traction-producing means, a chain 46 or a plurality of lugs 48, shown in Fig. 7, or any other form of traction-producing element. Arm 38, as shown in Fig. 2, is provided with an elongated slot 49 within which is a suitable rivet or short bolt 50 that extends through and is secured in member 36. The cooperative relationship between slot 49 and rivet 50 is to permit longitudinal movement of the arm 38 with relation to member 36 for a distance equal to the length of slot 49. Also formed as a part of arm 38, as shown in Figs. 2, 4, and 5 is a boss 52 having an aperture 54 therein.

A lever mechanism indicated by the general reference numeral 56 consists of a bifurcated portion 58 having extended therefrom a rod 60 terminating in an enlargement 62. The bifurcated portion 58 of the lever mechanism is pivotally mounted on a pin 64 which extends between a pair of bosses 66 and 68 that are formed integral with channel member 36. A pair of links 70 and 72 are pivotally connected by a pin 74 extending between the bifurcated portion 58 of the lever. At their other ends links 70 and 72 are joined by a pivot 76 to one end of a connecting member 78.

The connecting member 78 has a threaded end 80 which cooperates with a nut 82 and, as shown in Figs. 2, 4 and 5, member 78 extends through the aperture 54 of boss 52 formed on arm 38. The connecting member 78 loosely fits through aperture 54 so that nut 82 may be adjusted to vary the effective length of connecting member 78 and the point at which the lever mechanism becomes operative to move arm 38. As will be explained hereinafter, the purpose of this adjustment is to provide compensation for minor variations in the diameter of tire 12 so that the arcuate portion 44 will always snugly fit across the outer peripheral surface of tire 12.

As shown in Figs. 2, 3 and 4, a latching mechanism indicated by the general reference numeral 84, consists of a ring member 86 that is slidably mounted on the outer surface of rod 60. Extending from member 86 is a pawl 88, which as shown in Fig. 3, engages in a notch 90 of the tongue shaped extension 40 of arm 38. A compression spring 92 is positioned between member 86 and the enlargement 62 of rod 60 and serves to bias member 86 away from enlargement 62 and to hold the pawl 88 in engagement with notch 90 when the lever mechanism is in its secured position as shown in Figs. 2 and 3. A pair of finger holds 94 and 96 extend laterally from either side of member 86 and provide a manual means of gripping member 86 to move the same against the compression of spring 92 when the latching mechanism is to be released from its secured position.

The operation of the device will now be explained in detail. Referring first to Fig. 1, is shown the device 10 in its operative position on tire 12. When the device 10 is to be mounted on wheel 11 and its cooperating tire 12, the lever mechanism 56 is in an unlocked or raised position such as is indicated in Fig. 4, and the two arms 24 and 26 are rotated on their pivots 28 and 30 to a point where they are substantially parallel with extension 16 and its several cooperating parts. The arcuate portion 44 of arm 38 is placed about the upper surface of tire 12 and extends laterally thereto, the arms 24 and 26 which also have arcuate extremities similar to portion 44 are moved downwardly until their arcuate extremities encompass tire 12 and the angular portions 31 and 32 engage the abutments 33 and 34. Thereafter, lever mechanism 56 which is in the position shown in Fig. 4, is rotated through an arc of a circle whose plane is transverse to the plane of wheel 11 and also the plane in which the central member 14 and its several parts extend. Thus, it will be understood that the lever mechanism 56 is provided with an arcuate movement which is probably the most effective means of locking by manual operation, since the operator who is standing or kneeling in front of the wheel, as seen in Fig. 1, exerts a downward and inward movement of the lever mechanism 56 which is effectively aided by a substantial amount of the weight of the operator's body. The nut 82 is adjusted on the threaded portion 80 of the connecting member 78 so that when the lever mechanism 56 is in its downward position, as shown in Figs. 1 or 2, the arcuate portion 44 of arm 38 is snugly fitting laterally across the upper surface of tire 12. If the fit is not a tight fit, such as might be occasioned by either a variation in the diameter of the wheel structure or which might be caused by wear of the outer surface of tire 12, nut 82 is adjusted to bring about a tight fit, and preferably, the lever mechanism is moved to its unlatched position as to assure this operation taking place without much difficulty. Thereafter, the lever mechanism 56 is rotated on its pivot 64 causing the links 70 and 72 to draw the connecting member 78 and arm 38 downward to the point where the arcuate portion 44 firmly engages the tire, at which position the lever mechanism 56 is in the position shown in Figs. 1 and 2 and the pawl 88 of the latching device 84 becomes engaged in the notch 90 of the tongued extremity 40 of arm 38. In this position, the several arms 24, 26 and 38 are rigid and their several traction producing surfaces 46 or 48 will provide the necessary traction to enable the wheels to move through either snow or mud or on ice. To remove the device from the wheel, the operator places his fingers on the extensions 94 and 96 and pulls the ring 86 downwardly, which is accompanied by a slight inner pressure on the rod 60, bringing about a disengagement between pawl 88 and the notch 90 of tongue 40. Whereafter the lever mechanism 56 is rotated in a reverse direction to the position shown in Fig. 4, and the arms 24 and 26 are rotated upwardly so that the several arms are simultaneously removed from the tire adjacent its upper surface.

One major advantage of our invention is that the lever, which is utilized for locking the structure on the wheel, when in a position ready to be tightened, projects horizontally from the wheel and thus permits the operator to exert a much greater force during the locking action. This arrangement through a compound linkage exerts a force on the arm which is parallel with the line of movement of the movable arm.

Another major advantage is that the adjustable feature of the locking mechanism permits the structure to be adjusted to compensate for minor variations in the size of the tire and thus the device is always capable of being securely locked in an immovable manner on the wheel.

As numerous changes may be apparent to those skilled in the art, our invention is not limited by the single disclosure, but to the full extent of the appended claim.

We claim:

An anti-slipping device which is adapted for mounting on a vehicle wheel, comprising a central member formed with a plurality of angular extensions, one of said extensions being of greater length than the remainder and formed with grooved lateral edges, a movable arm held in sliding engagement within the grooved edges of said extension, a lever supported on said one extension and connected with said arm for linearly moving said arm in one direction with respect to said one extension, and a latching device carried on the outer end of said lever and adapted for engagement with said arm for locking said arm when the same has been moved to one of its linear extremities.

JAMES THOMAS WILLIAMS.
KARL F. RIESE.

REFERENCES CITED

The following references are of record in the file of this patent:

UNITED STATES PATENTS

| Number | Name | Date |
| --- | --- | --- |
| 1,882,376 | Weber | Oct. 11, 1932 |
| 2,174,345 | Worthing | Sept. 26, 1939 |
| 2,429,738 | Zimmer | Oct. 28, 1947 |
| 2,453,611 | Zimmer | Nov. 9, 1948 |
| 2,456,544 | Varner | Dec. 14, 1948 |